Patented Dec. 8, 1953

2,662,071

UNITED STATES PATENT OFFICE 2,662,071

PROCESS OF PRODUCING DICYANDIAMIDE-UREA - FORMALDEHYDE IMPREGNATING AGENTS

Egon Elöd, Badenweiler, Germany

No Drawing. Application February 10, 1950, Serial No. 143,612

Claims priority, application Switzerland February 16, 1949

7 Claims. (Cl. 260—69)

The present invention relates to a process of producing synthetic resins suitable for impregnating fibrous materials. More particularly it relates to a process of manufacturing new mixed pre-condensation products of amino-plasts as well as solid final condensation products of these mixed aminoplasts being soluble in water and suitable for use as impregnating agents.

The improvement of fibrous materials and materials containing fibers, such as textiles, wood and the like, f. i., by means of water soluble pre-condensation products of synthetic resins is well known. The treatment takes place in such a manner, that the material is impregnated with aqueous solutions of the pre-condensation products and the surplus of the impregnating solution having been removed the condensation product remaining in the textile material is heated in and on the fibers to higher temperatures and transformed into its solid final stage. In this way textiles and similar materials are made creaseproof and fast to shrinking or wood becomes harder and is improved as to its dimentional stability and still other advantages can be obtained. Until now usually aminoplasts have been practically used for these purposes, in the first line pre-condensation products of urea and aldehydes, especially of formaldehyde. The application of these pre-condensation products brings about the disadvantage, that the curing operation must be executed in the presence of acid catalysts or catalysts having an acid action, the fibers being impaired by the acid action at the relatively high curing temperatures exerting an unfavorable influence upon the strength of cellulose fibers, f. i. Another still bigger disadvantage is to be seen in the instability of the solutions of the pre-condensation products undergoing, even at normal temperature, continuous changes in the first line with respect to an increase of the particle size, particularly in the presence of catalysts. In the beginning the solutions of the pre-condensation products are crystalline-dispersal and are consequently able to penetrate as desired the fibrous materials to be improved. They lose this property, however, as soon as the particles have enlarged to a certain size. In consequence thereof the solutions of the pre-condensation products having not been used formerly or having been squeezed out of the impregnated material produce, when being re-used for impregnating fibrous materials for economic reasons, uncertain results and must be regarded to be no longer useful. In view of the instability of the solutions of the pre-condensation products it is impossible to produce in advance larger quantities of the impregnating solutions and to keep them in stock or to dispatch them.

It is also known to manufacture water soluble pre-condensation products of dicyandiamide and aldehydes, preferably formaldehyde, the pre-condensation products being stable unlike the urea aldehyde pre-condensation products. When being used as impregnating agents for fibrous material, especially for textiles, however, they are not completely satisfactory.

According to the present invention the production of water soluble pre-condensation products being distinguished by their excellent stability and other valuable properties is realized by manufacturing mixed condensation products containing apart from pre-condensation products of dicyandiamide and aldehydes pre-condensation products of other compounds capable of being condensed with aldehydes, advantageously of urea. In this manner stable impregnating solutions capable of being stored can be produced which can be used successfully without acid or acid acting or alkaline catalysts and excell, as to their properties and effects, the pre-condensation products manufactured out of dicyandiamide alone. The solubility in water of the mixed condensation products is more favorable for the improvement of textiles the textile material improved with solutions having a softer touch.

The presence of cyanamide causing no troubles in the manufacture of the mixed condensation products aqueous extracts of calcium cyanamide freed from calcium salts which contains besides dicyandiamide subordinated amounts of cyanamide can be used for producing the mixed condensation products. If compounds capable of forming aminoplasts, such as urea, thiourea or melamine or mixtures of those, are added, pre-condensation products are produced containing e. g. methyloldicyandiamide, dimethylolurea, trimethylolmelamine and the like all being interlaced with each other and having, on account of the presence of dicyandiamide-formaldehyde, the above mentioned good properties, particularly a good stability. Of course there is to take care that the dicyandiamide formaldehyde-pre-condensation product is present in an amount necessary for securing the stability of the mixed pre-condensate. Preparing mixed pre-condensates from urea and dicyandiamide it is advisable to use not less than about 1 part of dicyandiamide for 3 parts of urea. The mixed pre-condensation products manufactured according to the invention are clearly soluble in water, not colloidally. In consequence thereof they easily penetrate the fiber materials and there they are transformed into insoluble synthetic resins by the condensation taking place by heating the pre-condensation products to the curing temperature. The pre-condensation products which are present in the impregnating solutions and may be formed out of urea, f. i., prevent the dicyandiamide from crystallizing. The mixed pre-condensation products which are formed in the presence of cyanamide, f. i., this compound taking part in the condensation reaction, offer the advantage to be in the final stage distinctly more hydrophobic than the pure dicyandiamide formaldehyde resins.

The mixed pre-condensation products can be produced by causing the components to react with each other at room temperature or at moderately raised temperature. It is important, however, to take care, that the reaction takes place in a neutral or an approximately neutral medium. Using commercial formaldehyde having an acid reaction on account of the formic acid being present one must standardize the solution as to have a pH-value of about 7.

Additional experiments have shown, that the aqueous solutions of mixed pre-condensation produced according to the present invention can be transformed into even highly concentrated products capable of being stored and dispatched no troublesome changes taking place. The mixed products can be concentrated by carefully evaporating the neutral solution, e. g. under reduced pressure or by quick drying it, e. g. by atomizing. Preferably temperatures are applied not at all or not essentially exceeding 65° C. The concentrated products which are obtained and represent syrups or pastes or solid substances, preferably pulverulent ones, can be supplied to the plants for the impregnation of the fabrics and can be transformed into useful crystalline-dispersal stable impregnation solutions in water by merely dissolving them in water. This surprising effect is due to the fact, that the dicyandiamide formaldehyde component protects the other components, especially urea formaldehyde compounds, against undesired changes, in the first line against the increase of the particle size, if the production of the pre-condensation products and the concentration of the dissolutions of these pre-products are effected in a neutral or practically neutral medium.

A manner of practicing the invention includes the step of adding to the mixed pre-condensation products neutral substances being able to promote the curing of the mixed pre-condensation products, preferably ammonium compounds, such as ammonium nitrate and the like, f. i. It is advantageous to add to the mixed pre-condensation products supplementary substances of neutral reaction, such as the ammonium salts of the thiocyanic acid, the cyanuric acid, the barbituric acid, the lactic acid and others, f. i., which supplementary substances do scarcely influence the pH-value of the medium in the course of the condensation. In using such supplementary substances ammonia is set free, if the mixed pre-condensation products are heated for curing purposes and the acid, such as thiocyanic acid, f. i., is included into the synthetic resin aggregate an interlacing condensation of the constituents taking place. In this manner the properties of the improved products with regard to the fastness of the treated textiles to water and to washing can still be improved to a far-reaching degree. The neutral supplementary substances having been described above can be incorporated into the solutions of mixed pre-condensation products prepared according to the present invention as well as to the final concentrated products or to the aqueous solutions having been prepared by dissolving in water the concentrated products for being applied as impregnating agents.

Another manner of practicing the invention provides for manufacturing in steps of the mixed pre-condensation products soluble in water. This can be done as follows: At first dicyandiamide or an aqueous extract of calcium cyanamide is transformed into a pre-condensation product and mixed pre-condensation product respectively by means of formaldehyde in excess in the presence of water, then other substances capable of being condensed with formaldehyde, such as urea, melamine or both, f. i., are added and included as constituents into the condensation product. This condensation is effected in known manner, e. g. by carefully heating the neutral or practically neutral solutions. It can be advantageous to execute this condensation together with the concentration, this step being effected by heating.

The following examples are intended to illustrate the present invention. They are inserted without any view of limiting the invention. If not otherwise stated, the parts indicated in the examples are parts by weight.

(1.) 200 g. of dicyandiamide are dissolved in 1 liter of formaldehyde (40%) at a pH-value of about 7 while carefully heating. A clear solution having been formed the pH-value of this solution is standardized at a pH of 7 by adding concentrated ammonia or a concentrated solution of caustic soda, f. i., the solution is evaporated at reduced pressure at a temperature not exceeding 60° C., e. g. until a syrup-like mass results. An impregnating solution containing per liter about 200 g. resin-forming ingredients which is ready for use and is produced by diluting the syrup by means of water is mixed with 5 g. ammonium thiocyanate. After standing for 4 weeks the solution is absolutely clear and fully usable. By a comparative test it has been ascertained, that an aqueous urea formaldehyde pre-condensation product of equal concentration containing an equal quantity of ammonium thiocyanate had perfectly separated in flakes, after it had stood in the cold for 40 hours.

(2.) 1000 g. of calcium cyanamide are extracted at about 90° C. for 1½ hours by means of 3 liters of water. The filtrate containing about 200 g. of solid matter is dissolved at a pH-value of 7 in 1 liter of formaldehyde (40%) while carefully heating and 200 g. of urea are added to the solution having cooled down. The pH-value of the solution is standardized at 7 by means of a concentrated solution of caustic soda and the solution is transformed into a pulverulent product at a temperature of about 65° C. by means of a vacuum roller dryer. The powder obtained in this manner is still clearly soluble in water even after a prolonged time of storing and produces an unobjectionable stable impregnating solution.

The solutions of the mixed pre-condensation products and the final products produced from the pre-condensation products having been prepared according to the present invention have a practically unlimited stability and do not at all let see when being stored any unfavorable changes especially with respect to an increase of the particle size. The solution destined to be applied can be used at a pH-value being practically neutral. The acid or alkaline catalysts which have usually been used until now as additional products and often had an unfavorable influence are omitted. A rapid and even impregnation takes place when using the solutions the crystalloid-dispersal solutions smoothly penetrating the bodies to be impregnated and no undesired increase of the particle size of the solutions occurs. The residual impregnating solution can be used again and again without any trouble. Upon heating the impregnated bodies the resinous condensation products are rapidly cured. The application of the mixed condensation products according to the invention affords advantages as to the fastness to rubbing and washing of the improved textile materials in comparison with the application of urea formaldehyde condensation products as well as of dicyandiamide formaldehyde condensation products. The advantages are evident in the first line in creaseproofing artificial silk materials.

The mixed pre-condensation products prepared according to the invention permit a versatile application on account of their excellent properties. Apart from other kinds of application the improvement of wood causing an increase of the hardness and the fastness to water and a reduction of the swelling power of the wood, the improvement of textile materials, especially of fabrics containing cellulose fibers or fibers of cellulose hydrate, as to increasing their resistance to creasing and shrinking and as to reducing their swelling power, the improvement of wood fiber-made bodies, such as plates, f. i., as to increasing their hardness and resistance to water, the improvement of paper, especially as to increasing its strength in the wet state, are to be mentioned.

It is already known to produce stable solutions of water-soluble pre-condensation products of cyanamide and formaldehyde and to use them for creaseproofing textile fabrics in the presence of acid catalysts, such as tartaric acid, oxalic acid, acetic acid, formic acid. In such condensation products the cyanamide can wholly or partly be replaced by dicyandiamide and an aqueous extract of calcium cyanamide can be used as starting material. Moreover it is known to produce condensation products by causing dicyandiamide and formaldehyde to react with each other at a pH-value higher than 5, e. g. at a pH between 8 and 10, advantageously at boiling temperature and while applying raised pressure, the products thus obtained yielding when sufficiently heated a hydrophobic resin falling out of the solution on cooling (compare German patent specification No. 530,732).

It could not be foretold from the above mentioned publications, that solutions of mixed pre-condensation products can be produced from substances capable of being condensed with formaldehyde, such as urea and dicyandiamide, f. i., by causing them to react with formaldehyde under practically neutral reaction conditions, the solutions thus produced being stable in such a degree as to remain unchanged even when being stored for a prolonged time, which solutions can be transformed into concentrated products, also into solid materials giving again faultiness aqueous impregnating solutions and solutions for use as stable as permitting the residual impregnating solutions to be used again and again in impregnating operations no unfavorable increase of the particle size taking place.

Furthermore a process of producing molding powders is known comprising to transform dicyandiamide and formaldehyde into a hydrophobic condensation product by heating them at a reflux condenser for a longer time, e. g. for 1½ hours, the hydrophobic product when being brought into contact with water falling apart to a powder suitable for producing molded articles. The dicyandiamide can also be applied together with other substances capable of being condensed with formaldehyde, such as urea, phenol or cresol, condensation products having the same properties being formed also falling apart to a flour-like powder when getting into contact with water (compare British patent specification No. 287,177). The present process of producing stable mixed pre-condensation products giving crystalloid-dispersal solutions in water could not be seen either from this publication.

There is still another process of producing synthetic resins which comprises dissolving dicyandiamide in formaldehyde and heating the solution on the water bath for about 3 hours. In this process the dicyandiamide formaldehyde resin can be mixed with urea formaldehyde resin or a mixture consisting of dicyandiamide and urea can be condensed with formaldehyde. In any case a synthetic resin insoluble in water is produced by evaporating the solution; this is to be regarded as a proof of the fact, that the pre-condensation has taken place under conditions imparting a coarsely dispersal state to the particles of the synthetic resin. The condensation is supposed to have taken place in an acid medium, the acid reaction probably being due to the use of commercial formaldehyde always containing formic acid. If this is the case, the acid acting as a catalyst during the evaporation of the solution of the pre-condensation product causes the formation of a synthetic resin insoluble in water. Another proof of the fact, that the known process takes place under acid reaction conditions, is to be found in the statement of the publication, that the curing of the synthetic resin is going off by itself at 120° C. (compare British patent specification No. 314,358, especially page 5, line 65 and example 3, line 114.)

The present invention differs fundamentally from the process of the last mentioned British patent specification by carrying out the condensation in a neutral medium a crystalloid-dispersal stable solution of the pre-condensation product excellently suitable for the impregnation of textile material, wood and the like being produced. The solution when being evaporated renders condensation products soluble in water and capable of being transformed into highly valuable crystalloid-dispersal solutions for immediate use by merely dissolving in water the concentrated products even after a prolonged time of storing.

For the sake of distinctness and in order to exclude any uncertainty I wish to state, that the aldehyde used in the process of the present invention, in the first line formaldehyde, is caused to react with the other reaction components, such as dicyandiamide, urea, melamine and the like, at a rather low temperature, that means room temperature and moderately raised temperatures not exceeding about 60° C. The expressions "carefully heating" and "carefully dehydrating"

are intended to exclude temperatures higher than about 65° C.

I claim:

1. The method of preparing stable impregnating agents for finishing fibrous and fiber-containing materials and articles, said agents consisting of water-soluble precondensates of synthetic resins which are stable on storage, and which dissolve to form a crystalloid dispersion, which comprises reacting formaldehyde with urea and dicyandiamide in the presence of water in a substantially neutral reaction medium at a moderately elevated temperature below the boiling point, thereby producing mixed precondensates which are soluble in water to form a crystalloid dispersion, the quantity of the condensed dicyandiamide being so regulated that a sufficient amount is present to stabilize the mixed precondensate, there being present not less than 1 part by weight of dicyandiamide for every 3 parts by weight of urea.

2. The process of claim 1 which includes the steps of causing formaldehyde in excess to act in a practically neutral aqueous medium upon dicyandiamide, adding urea to the reaction mixture and causing the condensation to go on, the resulting mixed pre-condensation products being stable substances of a crystalloid-dispersal character.

3. The process of claim 1 which includes the step of subsequently dehydrating carefully the reaction mixture while maintaining the practically neutral reaction, the resulting concentrated product representing the mixed pre-condensation products in a water-soluble stable crystalloid-dispersal state.

4. The process of claim 1 which includes the steps of causing formaldehyde in excess to act in a practically neutral aqueous medium upon dicyandiamide, adding urea to the reaction mixture and subsequently dehydrating the reaction mixture by carefully evaporating in the water while maintaining the practically neutral reaction, the resulting concentrated product representing the mixed pre-condensation products in a water-soluble stable crystalloid-dispersal state.

5. The method defined in claim 1, wherein the solution of dicyandiamide utilized in the reaction for the preparation of said mixed pre-condensation products is obtained by extracting calcium cyanamide with hot water.

6. The method defined in claim 1, wherein there is added to said aqueous, practicaly neutral solution of mixed pre-condensation products a small amount of an ammonium salt of a weak acid which, upon the condensing out of said pre-condensate, is co-condensed in said condensate by heating in the presence of said fibers to be impregnated, with lattice-like polymerization.

7. The method as defined in claim 1 in which, in addition to dicyandiamide and urea reacted with formaldehyde, there is also added in minor quantity to the water-soluble mixed precondensate a supplementary substance of substantially neutral reaction selected from the group which consists of the ammonium salts of thiocyanic, cyanuric, barbituric and lactic acids.

EGON ELÖD.

References Cited in the file of this patent

UNITED STATES PATENTS

| Number | Name | Date |
| --- | --- | --- |
| 1,780,636 | Stine | Nov. 4, 1930 |
| 1,791,434 | Schmidt | Feb. 3, 1931 |
| 2,088,227 | Battye | July 27, 1937 |
| 2,214,067 | Peterson | Sept. 10, 1940 |
| 2,328,593 | Widmer | Sept. 7, 1943 |
| 2,387,547 | Widmer | Oct. 23, 1945 |
| 2,520,100 | Morfit | Aug. 22, 1950 |
| 2,523,477 | Nagy | Sept. 26, 1950 |
| 2,550,746 | Wohnsiedler | May 1, 1951 |

FOREIGN PATENTS

| Number | Country | Date |
| --- | --- | --- |
| 287,177 | Great Britain | 1929 |
| 435,871 | Great Britain | Oct. 1, 1935 |